United States Patent Office 2,984,004
Patented May 16, 1961

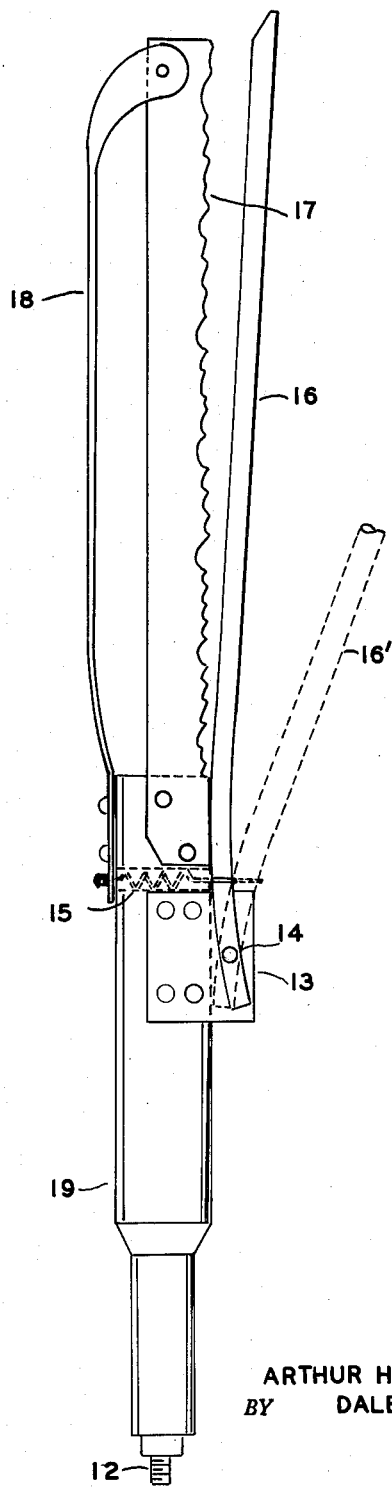

2,984,004

AUTOMATIC PRESSURE BAR WOOD SAW

Arthur Henry Dalby-Balls, Newport Pagnell, England, assignor to William John Sampson, New York, N.Y.

Filed May 26, 1959, Ser. No. 816,015

1 Claim. (Cl. 30—166)

This invention relates to wood saws and more particularly to such means for cutting off tree branches when the operator stands on the ground.

It is an object of the present invention to provide a device to cut branches of trees at a considerable height from the ground. With a conventional saw it is necessary to stand on a step-ladder or the like, which is not always desirable, and it is the primary object of the invention to provide means whereby such branches may be sawed off by someone standing on the ground.

A further object of the present invention is to provide a saw which can be produced and sold in large quantities at a comparatively low cost, and which can be conveniently utilized whenever needed.

Still additional objects, benefits, and advantages of this invention will become evident from a study of the following detailed description taken in conjunction with the accompanying drawing, in which:

The drawing is a plan view of a saw made in accordance with the present invention.

Referring now specifically to the drawing, a tree branch saw made in accordance with the present invention is shown to include a threaded rod 12 to take extension handles of any desired length together with a spring loaded pressure bar 16 to exert pressure on the branch or member being cut, to force it into contact with the teeth of the saw 17. The saw is thus provided with a handle 19 at one end to take extension rods to any given height. It will be apparent that with such an extension handle, although it will be possible to reach a branch placed at a considerable height, it would be extremely difficult to exert the necessary pressure to cause the saw blade 17 to cut into the word. For this purpose there is provided, in accordance with the invention, at least one pressure bar 16 pivoted on handle 19 adjacent the handle end of the saw blade 17 and acted on by a bar loading spring 15 connected to the handle 19 of the saw. Spring 15 extends through a shaftway in handle 19 and is anchored to the base of member 18.

Behind the bar loading spring 15 and fastened to the saw handle 19 is pivot support bracket 13. The pressure bar 16 is fastened to the pivot support bracket 13 by a pivot bolt 14, and the pressure bar 16 is curved near the mounting so that normally there is an opening between the front end of the saw blade 17 and the free end of the pressure bar 16 so that they can be passed on either side of the branch for cutting.

A steel blade stiffening support 18 preferably connects the back of the saw blade 17 at its outer end to the handle 19 and extends over the length of the saw blade 17. Dash lines 16' show the pressure bar 16 in an open position.

The operation of this device will now be readily understood. During the cutting operation the pressure bar 16 is moved away from the saw blade 17 by one side of the branch, and the resulting tension of the bar loading spring 15 is such as to force the branch into contact with the saw blade 17. In order to check the reaction of the saw blade 17, a steel blade support 18 is provided connecting the back of the saw at its outer end to the handle 19 and extending over the length of the saw blade 17.

While this invention has been described with particular reference to the construction shown in the drawing and while various changes may be made in the detail construction, it shall be understood that such changes shall be within the spirit and scope of the present invention as defined by the appended claim.

Having thus completely and fully described the invention, what is now claimed as new and desired to be protected by Letters Patent of the United States is:

A tree branch saw comprising a handle, a straight saw blade mounted on said handle, a pressure bar pivotally mounted on said handle, a spring connected to spring load said pressure bar towards said saw blade, said pressure bar being connected to touch said saw blade adjacent its mounting on said handle and being curved and extending outwardly in a straight line to present a straight line edge that diverges away from said saw blade so that a branch may easily enter between said saw blade and said pressure bar, and a stiffening member mounted on said handle and connected to the free end of said blade.

References Cited in the file of this patent

UNITED STATES PATENTS

| 1,310,904 | Carter | July 22, 1919 |
| 1,697,088 | Reed | Jan. 1, 1929 |
| 1,771,664 | Swick | July 29, 1930 |
| 1,868,349 | Ditch | July 19, 1932 |

FOREIGN PATENTS

| 40,963 | Germany | Sept. 24, 1887 |
| 161,860 | Germany | Aug. 3, 1903 |
| 183,264 | Austria | Sept. 26, 1955 |